United States Patent [19]
Kojima et al.

[11] 4,419,753
[45] Dec. 6, 1983

[54] NETWORK CONNECTION SYSTEM

[75] Inventors: Takuhito Kojima, Yamato; Yasuo Satake, Kawasaki; Toru Masuda, Fujisawa, all of Japan

[73] Assignee: Fujitsu Limited, Kawasaki, Japan

[21] Appl. No.: 192,811

[22] Filed: Oct. 1, 1980

[30] Foreign Application Priority Data

Oct. 6, 1979 [JP] Japan .................................. 54-129136

[51] Int. Cl.³ ........................ H04J 3/06; H04Q 11/04; H04M 3/56
[52] U.S. Cl. .................................. 370/62; 179/18 AH
[58] Field of Search ............................. 370/62, 68, 67; 179/18 BC, 1 B, 1 CN, 18 ES, 18 EA, 18 AG, 18 AH, 18 H, 18 HA

[56] References Cited

U.S. PATENT DOCUMENTS 3,886,315  5/1975  Lee et al. ..................... 179/18 AH
4,201,890  5/1980  Lawrence et al. ................ 370/68
4,293,946  10/1981  Kuras et al. ..................... 370/62

Primary Examiner—Thomas A. Robinson
Attorney, Agent, or Firm—Staas & Halsey

[57] ABSTRACT

An electronic exchange of the time division system type or the space division system type, employing electronic contacts, in which a U-junctor is connected to the switching network of the electronic exchange. The switching network program for controlling the connection of the switching network regards the U-junctor as a combination of an outgoing and an incoming trunk. The connection between the trunks, between subscribers or between each subscriber and each trunk in a special calling service is controlled by using the U-junctor and the switching network.

8 Claims, 8 Drawing Figures

NETWORK CONNECTION SYSTEM

BACKGROUND OF THE INVENTION

1. Field of the Invention

The present invention relates to a network connection system which is capable of offering special services such as a three way calling service and so forth in an electronic telephone exchange of the time division system type or the space division system type using electronic contacts such as transistors or the like.

2. Description of the Prior Art

A variety of special services can easily be offered through utilization of an electronic exchange and they can be combined in various ways. Combining all the special services involves an enormous computer program, and hence is not practical. Accordingly, it is general practice in the prior art to offer a limited number of several kinds of special services or some limited number of combinations of special services.

In a conventional electronic exchange having mechanical contacts, release or the like of a subscriber in an intra-office call is supervised by an intra-office trunk circuit and a special service connection to the subscriber can be accomplished by connecting the subscriber within the local office system via the intra-office trunk circuit. When the special service connection is accomplished, by regarding the intra-office trunk circuit as a combination of an outgoing and an incoming trunk, that is, by processing the intra-office connection as a combintion of an outgoing and an incoming connection, the necessity of using a specialized program for the intra-office connection can be eliminated, and consequently the program can be simplified.

In an electronic exchange of the time division system type or the space division system type which employs electronic contacts such as transistors or the like, because a DC loop cannot be supervised through such a switching network, it is impossible to provide an intra-office trunk equivalent to that used in the electronic exchange having mechanical contacts. Accordingly, an intra-office connection cannot be handled in the same manner as in the electronic exchange provided with mechanical contacts, and a complicated program is required for offering various special services when the contacts are electronic.

SUMMARY OF THE INVENTION

It is an object of the present invention to provide a network connection system which is capable of offering a plurality of special services concurrently in an electronic exchange of the time division system type and the space division system type using electronic contacts.

Another object of the present invention is to provide a network connection system which is capable of offering special services without complicated programs.

Briefly stated, according to the present invention, in an electronic exchange of the time division system or the space division system type using electronic contacts, a two way folded link called a U-junctor is connected to a switching network and is controlled as a combination of an outgoing and an incoming trunk by a non-specialized program to permit three way calling service and other special services.

DESCRIPTION OF THE PREFERRED EMBODIMENTS

Figure 1:
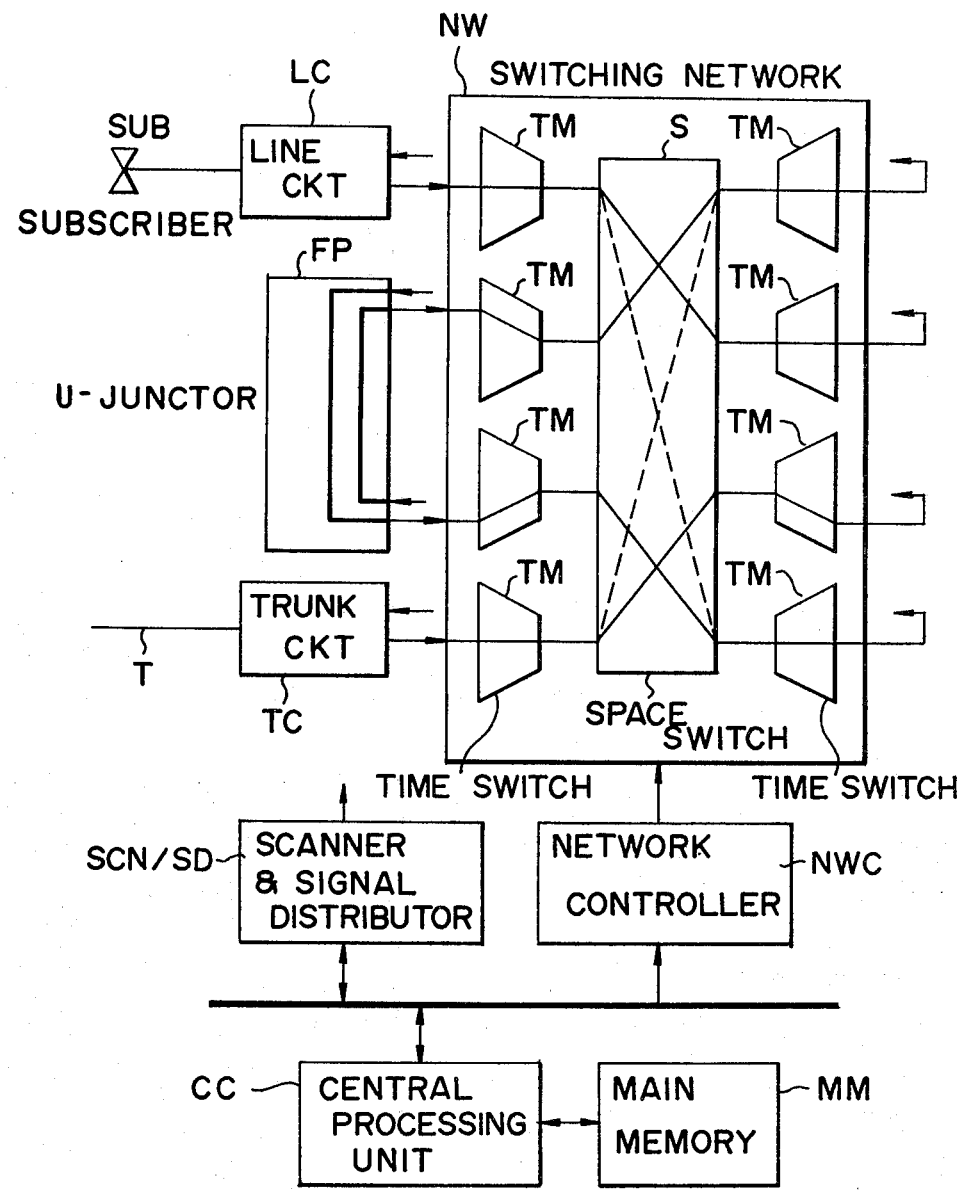
FIG. 1 is a block diagram illustrating an embodiment of the present invention.

FIG. 1 illustrates in block diagram form an embodiment of the present invention as applied to a time-division switching system. In FIG. 1, reference character SUB indicates a subscriber; LC designates a line circuit including a codec; NW identifies a switching network; TM denotes time switches for exchanging time slots and performing other functions; S represents a space switch which forms a speech path by operating on a time-divison basis; NWC shows a network controller for controlling the switching network; T refers to a trunk; TC indicates a trunk circuit; SCN/SD designates a scanner and signal distributor which performs scanning for detecting a status change of each part of the system and distributes various signals to each part of the system; MM identifies a main memory; CC denotes a central processing unit; and FP represents a U-junctor.

The lines from the time switches TM on the right-hand side of the switching network NW are each respectively connected to the line circuit LC, the U-junctor FP and the trunk circuit TC; in FIG. 1, however, their connections are not shown for the sake of simplicity. Since the construction and control of the time switches TM and the space switch S are similar to those employed in the ordinary time-division switching system, no detailed description will be given thereof.

The subscriber SUB and the trunk circuit TC are interconnected via a route passing through the U-junctor FP as indicated by the solid lines in the space switch S or via a route indicated by the broken lines. An intra-office connection can be established, for example, by replacing the trunk circuit TC with an intra-office subscriber.

Figure 2A:
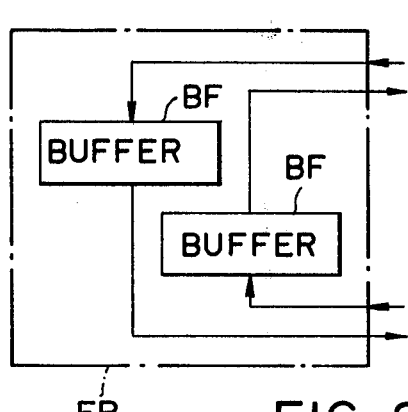
FIGS. 2A through 2C, inclusive, are block diagrams respectively showing specific examples of U-junctors for use in the present invention.
Figure 2B:
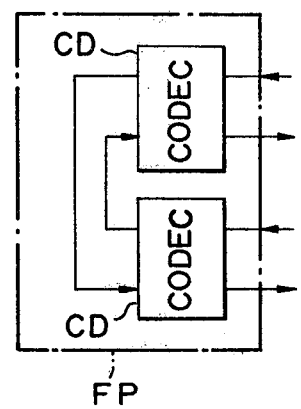
Figure 2C:
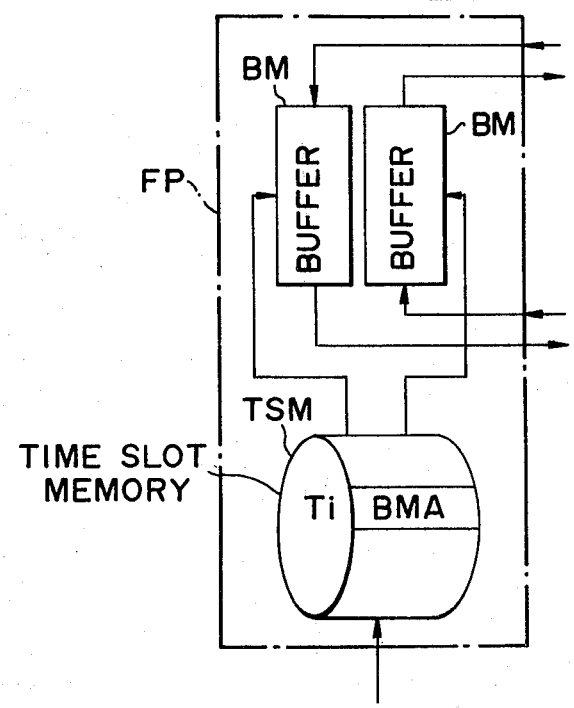

FIGS. 2A to 2C illustrate specific examples of the U-junctor FP. FIG. 2A shows an arrangement in which buffers BF are each provided for storing one sample of a voice signal. FIG. 2B shows an arrangement in which codecs (coder-decoders) CD are interconnected via an analog circuit. FIG. 2C shows a time division multiplex arrangement, in which addresses BMA of buffers BM, each corresponding to one time slot Ti, are written in a time slot memory TSM and sequentially read out therefrom by output signals from a time slot counter (not shown). In dependence upon the addresses BMA, data corresponding to channels are read out of one buffer BM and written into another buffer BM; accordingly, a plurality of U-junctors can be connected on a time-divided basis.

Figure 3:
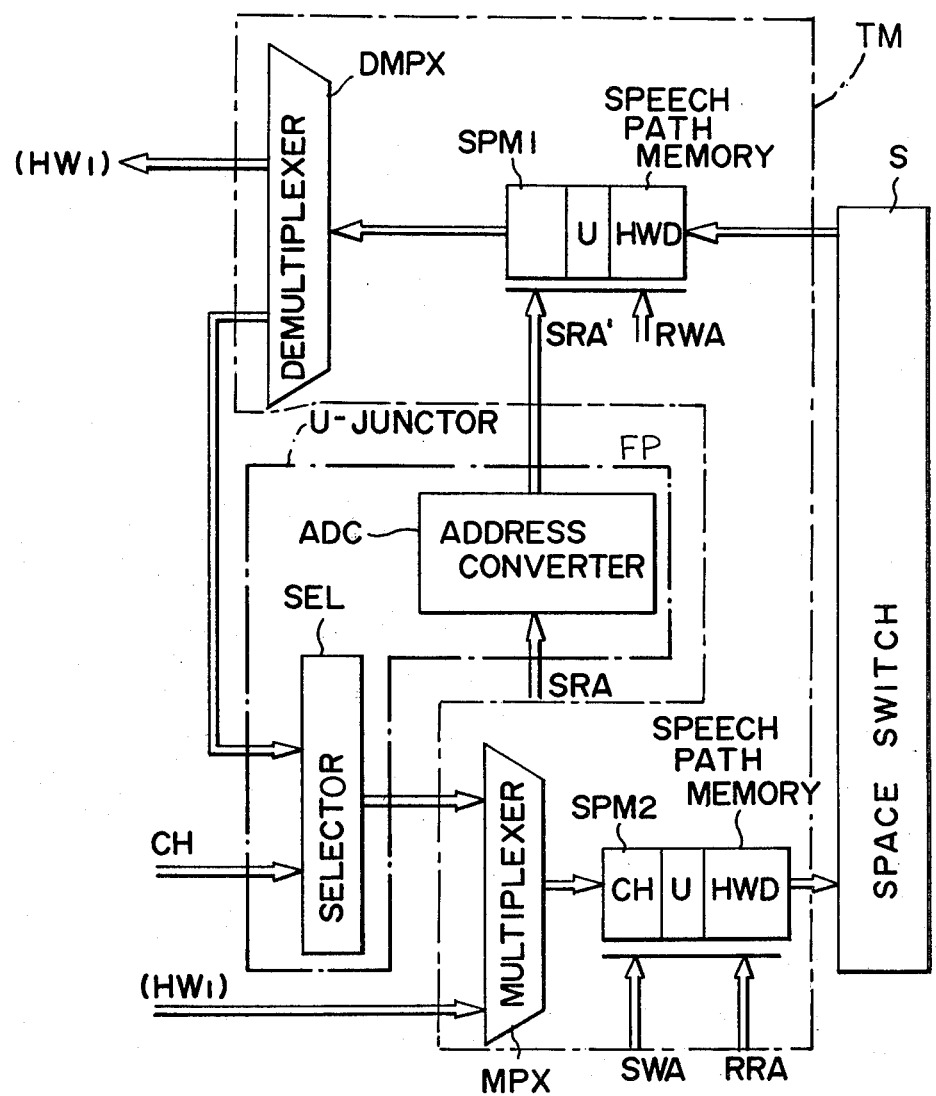
FIG. 3 is a block diagram illustrating a specific example of a combination of the U-junctor and a time switch.

FIG. 3 is a block diagram showing the relationship between the U-junctor and a time switch TM. The time switch TM comprises speech path memories SPM1 and SPM2, a multiplexer MPX and a demultiplexer DMPX.

The U-junctor comprises a selector SEL and an address converter ADC. The selector SEL outputs, to the multiplexer MPX, foldover data U from the demultiplexer DMPX for one half of one frame and a digitized voice signal from an ordinary subscriber SUB for the other half of one frame. Data from a highway $HW_1$, channel signal data CH for special use such as tone signals, and foldover data U are applied to the multiplexer MPX and then written into the speech path memory SPM2 in dependence upon a sequential write address SWA and read out of the speech path memory SPM2 following a random read address RRA for input into the space switch S.

Further, data from the space switch S are outputted to the speech path memory SPM1 and written therein in dependence upon a random write address RWA and read out from SPM1 following a sequential read address SRA' converted by the address converter ADC from the sequential read address SRA. The foldover data U is separated by the demultiplexer DMPX and applied to the U-junctor FP, then it is written in the speech path memory SPM2, as described previously.

Figure 4:
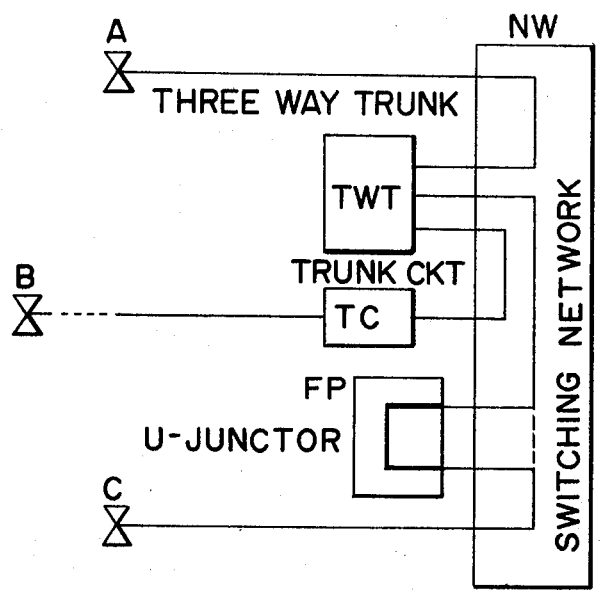
FIGS. 4 and 5 are illustrative of a three way calling service and a call waiting service.

When three way call service is desired, subscribers A, B and C are interconnected via a three way trunk TWT, as shown in FIG. 4. The subscribers A and C are intraoffice subscribers connected to the local office system and the subscriber B is a subscriber from an external office. The subscriber B is connected via the trunk circuit TC to the switching network NW. The line circuits of the subscribers A and C are not shown for convenience. The subscriber C is shown to be connected via the U-junctor FP to the three way trunk TWT, however, subscriber C is usually connected directly to the three way trunk TWT from the switching network NW through the path shown by the broken line. When the subscribers A, B and C are thus connected to the three way trunk TWT, mutual communication among them is possible.

Figure 5:
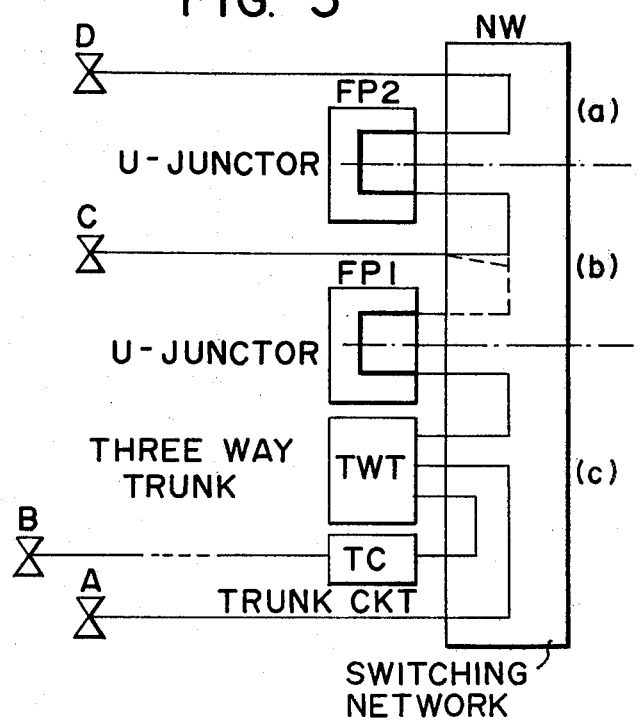

For example, in the case where the subscriber C receives a call from a subscriber D during the three way calling service shown in FIG. 4 and subscriber C is provided with the so called call waiting service, in the beginning subscriber C is connected via a newly seized or an already seized U-junctor FP1 to the three way trunk TWT as shown by the broken line of FIG. 5. Next the broken-line speech path of the switching network NW between the subscriber C and the U-junctor FP1 is temporarily held. Then the connection between C and D through FP2 is made, thus interconnecting the subscribers C and D via a U-junctor FP2, as shown in FIG. 5. The holding of the speech path in the switching network NW can easily be effected by known methods.

While the subscribers C and D are interconnected, the speech path indicated by the broken line is cut off, so that their talking cannot be heard by the subscribers A and B. When the communication between the subscribers C and D is completed, the three way calling state can be re-established by releasing or temporarily holding the speech path between the subscriber C and the U-junctor FP2 and connecting again the speech path between the subscriber C and the U-junctor FP1 which was temporarily held previously. In this case, at a request from subscriber C, subscriber C can be reconnected to subscriber D via the U-junctor FP2, temporarily holding again the speech path between the subscriber C and the U-junctor FP1. In this way, the three way call service and the call waiting service can both be offered.

When the subscriber A receives a call, for example, from the subscriber D, the three way trunk TWT and the subscriber A are interconnected via a U-junctor and then the same control as described above, in the call from the subscriber D to the subscriber C, is performed.

The above-mentioned U-junctors are each controlled by regarding the U-junctor as a combination of an incoming and an outgoing trunk. For example, in FIG. 5, in the case of the call from the subscriber D to the subscriber C who is in a three way call, the subscriber D and the U-junctor FP2 are connected in the part (a) of the switching network NW by a program for controlling the connection between the subscriber D and the outgoing trunk connected to the U-junctor FP2. The U-junctor FP2 and the subscriber C are connected in the part (b) of the switching network NW by a program for call waiting service and for controlling the connection between the incoming trunk connected to the U-junctor FP2 and the subscriber C. The U-junctor FP1, the three way trunk TWT, the trunk circuit TC and the subscriber A are interconnected in the part (c) of the switching network NW by a three way calling control program.

As described above, the programs used differ with the services involved but the U-junctors are each controlled, by treating the U-junctor as an incoming and an outgoing trunk, so that the program for interconnecting an originating and a terminating subscriber via the U-junctor may be a program for interconnecting trunk circuits or the subscriber and the trunk circuit. Further, it is possible to divide all connections into individual basic connections for new services. Accordingly, connections for offering various services can be controlled by relatively simple programs. The foregoing description has been given in connection with the case where the U-junctor is used only when the need for of a plurality of services occurs, but the U-junctor can also be used at all times regardless of economical considerations.

Figure 6:
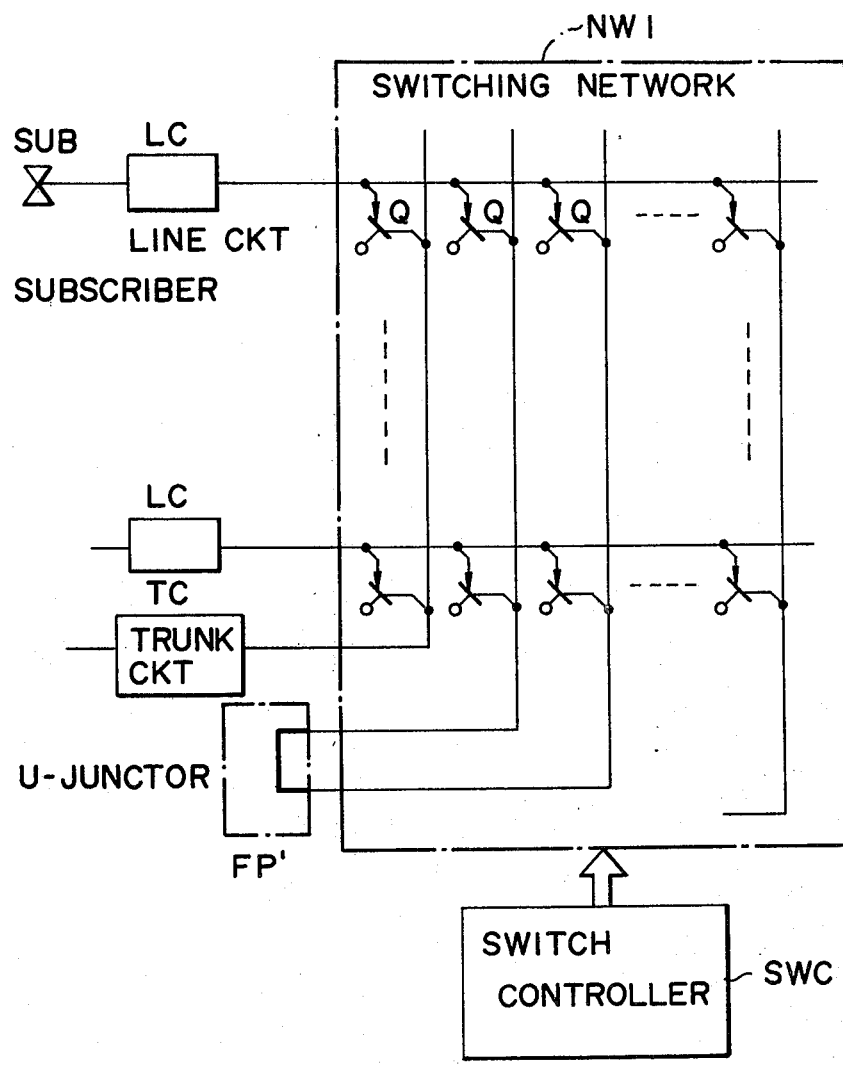
FIG. 6 is a block diagram illustrating the principal part of a space division network in accordance with another embodiment of the present invention.

FIG. 6 is illustrative of an embodiment of the present invention as applied to a switching network NW1 of the space division system type which employs transistors Q as electronic contacts. The transistors Q are each controlled by a control signal which is applied thereto via a control signal line (not shown) from a switch controller SWC. The switching network NW1 is shown with a single-stage arrangement and the U-junctor FP' is shown as connected to the vertical lines of the switching network NW1. It is also possible to employ a multistage arrangement of such switching networks NW1; in this case, vertical lines of the switching network of the preceding stage are connected to horizontal lines of the switching network of the next stage and a U-junctor is connected to the vertical or horizontal lines of the switching network of the final stage.

Origination, release and so forth of the subscriber SUB is supervised by the line circuit LC. The trunk circuit TC also includes a supervisory circuit. For controlling such special services as the three way calling service and the call waiting service with a space switch as shown in FIG. 6 the U-junctor FP' is used and is an embodiment of the present invention as described previously. In FIG. 6, only one U-junctor FP' is shown but a plurality of such U-junctors can be provided.

As has been described in the foregoing, the present invention employs a U-junctor in the switching network of an electronic exchange of the time division system type or the space division system type using eletronic contacts, and the electronic exchange controls the connection of the switching network by regarding the U-junctor as a combination of outgoing and incoming trunks. Accordingly, by using pluralities of three way trunks and U-junctors, the three way calling service for more than three subscribers can also be easily achieved. Also, the call waiting service can readily be performed during the three way calling service, and combinations of other special services can be easily provided through utilization of the U-junctor.

It will be apparent from the above discussion that many modifications and variations may be effected without departing from the scope of the novel concepts of this invention.

What is claimed is:

1. A network connection system for an electronic exchange of the time division system type or the space division system type, employing electronic contacts, the electronic exchange including a switching network having trunk lines and subscriber lines connected to subscribers, said network connection system comprising a U-junctor operatively connected to at least two trunk lines of the switching network of the electronic exchange, for selectively establishing an operable connection between at least two trunk lines, so that the U-junctor acts as a combination of an outgoing and an incoming trunk, the electronic exchange controlling the connection between the trunks, between subscribers or between each subscriber and each trunk by controlling both the switching network and the U-junctor.

2. A network connectin system according to claim 1, wherein the swiching network transmits and receives signals in time slots, and wherein said U-junctor comprises a buffer, operatively connected between at least two trunk lines, having a storage capacity of one time slot for temporarily storing signals transmitted and received by the trunk lines.

3. A network connection system according to claim 1, wherein said U-junctor comprises:
   a codec; and
   an analog circuit operatively connected to said codec.

4. A network connection system according to claim 1, wherein the switching network transmits and receives signals, and wherein said U-junctor comprises:
   a buffer, operatively connected to at least two trunk lines, for temporarily storing the signals transmitted to and received from the trunk lines;
   a time slot memory, operatively connected to said buffer, for controllably transferring signals stored in said buffer to the trunk lines and for controllably storing signals received from the trunk lines.

5. A network connection system as recited in claim 1, wherein each trunk line has an input and an output, and wherein said U-junctor comprises:
   a first buffer having an input operatively connected to the output of a first of the trunk lines and having an output operatively connected to the input of a second of the trunk lines; and
   a second buffer having an input operatively connected to the output of the second of the trunk lines and having an output operatively connected to the input of the first of the trunk lines.

6. A network connection system as recited in claim 1, wherein the electronic exchnge generates a first sequential read address, wherein the time division system includes a multiplexer, a demultiplexer that generates foldover data and a speech path memory operatively connected to the demultiplexer, and wherein said U-junctor comprises:
   a selector, having an input operatively connected to the demultiplexer for receiving the foldover data and having an output operatively connected to the multiplexer, for selectively transferring the foldover data from the demultiplexer to the multiplexer; and
   an address converter, having an input operatively connected to the electronic exchange for receiving the first sequential read address and having an output operatively connected to the speech path memory, for converting the first sequential read address into a second sequential read address.

7. A network connection system according to claim 1, wherein the trunk lines include first and second trunk lines, and wherein said U-junctor comprises:
   a first codec having a first input operatively connected to the first trunk line, having a second input, having a first output operatively connected to the first trunk line and having a second output; and
   a second codec having a first input operatively connected to the second trunk line, having a second input operatively connected to the second output of said first codec, having a first output operatively connected to the second trunk line and having a second output operatively connected to the second input of said first codec.

8. A network connection system according to claim 7, wherein said first and second codecs comprise:
   a decoder, having an input which is the first input of said codec operatively connected to at least one of the trunk lines, and having an output which is the second output of said codec operativelyconnected to the other codec, for performing a digital-to-analog conversion; and
   a coder, having an input which is the second input of said codec operatively connected to the second output of the other codec, and having an output which is the first output of said codec operatively connected to said at least one of the trunk lines, for performing an analog-to-digital conversion.

* * * * *

UNITED STATES PATENT AND TRADEMARK OFFICE
CERTIFICATE OF CORRECTION

PATENT NO. : 4,419,753

DATED : December 6, 1983

INVENTOR(S) : TAKUHITO KOJIMA ET AL

It is certified that error appears in the above-identified patent and that said Letters Patent is hereby corrected as shown below:

Column 4, line 60, after "6", insert --,--.

Column 5, line 31, "connectin" should be --connection--.

Column 6, line 47, "operativelyconnected" should be --operatively connected--.

Signed and Sealed this

Thirty-first Day of July 1984

[SEAL]

Attest:

Attesting Officer

GERALD J. MOSSINGHOFF

Commissioner of Patents and Trademarks